United States Patent
Nagao et al.

(10) Patent No.: US 8,524,308 B2
(45) Date of Patent: Sep. 3, 2013

(54) PROCESSED TEA LEAF PRODUCT OBTAINED BY EXTRUSION

(75) Inventors: Koji Nagao, Yokohama (JP); Koichi Nakahara, Toyonaka (JP); Hideki Maki, Yokohama (JP); Mika Kimura, Kawasaki (JP)

(73) Assignee: Suntory Beverage & Food Limited, Tokyo (JP)

( * ) Notice: Subject to any disclaimer, the term of this patent is extended or adjusted under 35 U.S.C. 154(b) by 329 days.

(21) Appl. No.: 11/794,305

(22) PCT Filed: Dec. 27, 2005

(86) PCT No.: PCT/JP2005/023950
§ 371 (c)(1),
(2), (4) Date: Jun. 27, 2007

(87) PCT Pub. No.: WO2006/070828
PCT Pub. Date: Jul. 6, 2006

(65) Prior Publication Data
US 2008/0138489 A1 Jun. 12, 2008

(30) Foreign Application Priority Data
Dec. 28, 2004 (JP) ................................ 2004-379780

(51) Int. Cl.
*A23F 3/00* (2006.01)
(52) U.S. Cl.
USPC ............ 426/597; 426/435; 426/448; 426/516
(58) Field of Classification Search
USPC ........................ 426/448, 597, 592, 435, 516
See application file for complete search history.

(56) References Cited

U.S. PATENT DOCUMENTS 4,459,315 A * 7/1984 Salo .............................. 426/590
5,358,729 A * 10/1994 Ohkuma et al. ............... 426/567
(Continued)

FOREIGN PATENT DOCUMENTS

EP 1 532 869 A1 5/2005
JP 11-009219 1/1999
(Continued)

OTHER PUBLICATIONS

Hwang et al. [KR 2001112817] (DWPI 2002-412379) Dec. 22, 2001 World Patents Index. Retrieved Sep. 7, 2012.*

(Continued)

*Primary Examiner* — Drew Becker
*Assistant Examiner* — Luana Z Long
(74) *Attorney, Agent, or Firm* — Drinker Biddle & Reath LLP

(57) ABSTRACT

The present invention provides a technique for producing a tea wherein water-insoluble components of tea leaves have been made soluble in water and the natural umami components inherent to tea leaves have been increased. It also provides a technique for manufacturing a tea-based alcoholic drink which has "tea leaf-origin aroma", "umami and body" and "mild alcoholic aftertaste" in a good balance. Tea leaves are processed with an extruder at a temperature of 80 to 150° C. and under a pressure of 0.2 to 30 MPa for 5 to 600 sec while supplying 1 to 100 parts by weight, per 100 parts by weight of the tea leaves, of water or an aqueous sugar solution, Thus, a processed tea leaf product is stably produced while avoiding blowout from the outlet. A tea extracted from this processed tea leaf product shows a significantly improved taste.

8 Claims, 4 Drawing Sheets

(56) References Cited

U.S. PATENT DOCUMENTS

| | | | |
|---|---|---|---|
| 6,090,431 A * | 7/2000 | Franklin et al. | 426/590 |
| 2005/0008753 A1 | 1/2005 | Honda et al. | |
| 2005/0260326 A1 | 11/2005 | Kageyama et al. | |

FOREIGN PATENT DOCUMENTS

| | | |
|---|---|---|
| JP | 2002-095437 | 4/2002 |
| JP | 2002-233354 | 8/2002 |
| JP | 2003-52316 | 2/2003 |
| JP | 2005-304324 | 11/2005 |
| JP | 2005-333815 | 12/2005 |
| JP | 2005-333862 | 12/2005 |
| TW | 2004-16285 | 9/2004 |
| WO | WO 03/022066 A1 | 3/2003 |
| WO | 03/105610 | 12/2003 |

OTHER PUBLICATIONS

Hwang et al. [KR 2001112817] Machine Translation. Retrieved from Korean Intellectual Property Office Sep. 6, 2012.*

European Search Report mailed May 14, 2009 in European patent application No. EP 05 82 2719.0.

International Search Report dated Mar. 14, 2006 in International PCT Application No. PCT/JP2005/023950.

* cited by examiner

PROCESSED TEA LEAF PRODUCT OBTAINED BY EXTRUSION

CROSS REFERENCE TO RELATED APPLICATIONS

This application is the National Stage of International Application No. PCT/JP2005/023950, filed Dec. 27, 2005, and claims benefit of Japanese Application No. 2004-379780, filed Dec. 28, 2004, both of which are herein incorporated by reference in their entirety.

TECHNICAL FIELD

The present invention relates to a method of processing tea leaves by using an extruder and a processed tea leaf product. More specifically, it relates to a technique for increasing natural umami components inherent to tea leaves in a tea leaf extract by adding water or an aqueous sugar solution to tea leaves and making water-insoluble components in the tea leaves soluble in water. The present invention further relates to a tea-based alcoholic drink produced by starting with the processed tea leaf product as described above, and to a method of producing the same. More specifically, it relates to a technique for manufacturing a tea-based alcoholic drink, which has "tea leaf-origin aroma", "umami and body" and "mild alcoholic aftertaste" in a good balance, comprising the step of extracting a starting material containing the processed tea leaf product as described above with a solvent containing an alcohol to give a tea extract.

BACKGROUND ART

As disclosed by Japanese Patent No. 3447191 and JP-A-2001-286260, known techniques for increasing the natural umami (favorable taste, savoriness and/or taste with fullness) components of tea drinks comprise dipping tea leaves in water while controlling temperature, pressure or dipping time to thereby optimize an efficiency of extracting the water-soluble natural umami components contained in the tea leaves.

According to *Shin Sagyo Zensho,* 8th ed., 1988 (Chamber of Tea Association of Shizuoka Pref.), however, the content of water-soluble components of tea leaves is restricted to about 40%. Therefore, only a limited amount of the natural umami components can be obtained by the above-described methods. In recent years, therefore, there has been proposed a method comprising blending finely ground tea leaves with a tea extract to thereby impart natural umami components of tea leaves that have thus far not been utilized since they are not soluble in water, as disclosed in PCT/JP2004/008349. However, this method suffers from a disadvantage that since the natural umami components are not dissolved but taken as solids, the drink has a powdery or coarse (heavy) texture which impairs a pleasant refreshing mouth feel of tea. Recently, attempts have been also made to increase natural umami components in a tea extract by enzymatically treating tea leaves with, for example, cellulase or protease and thus making water-insoluble components soluble in water, as disclosed by Japanese Patent No. 3157539.

As an example of the methods of making water-insoluble components soluble in water by using an additive that is employed in different fields, Japanese Patent No. 3435492 discloses a technique of solubilizing cellulose in water by using a formic acid/calcium chloride based medium. In a case where water-insoluble components are made soluble in water by adding such substances, however, the substances other than tea leaves and water affect the flavor. Therefore, these methods are seemingly not adequate for effectively drawing out natural umami components.

Recently, there are increasing needs for tea-based alcoholic drinks. It is required that a tea-based alcoholic drink has a rich tea leaf-origin aroma. When provided as packed beverages, it is possible to easily have these tea-based alcoholic drinks anytime.

To extract the aroma components into a drink, there have been proposed various techniques. For example, JP-A-2002-209519 discloses an alcohol extraction method focusing on the fact that most of the aroma components are fat-soluble. JP-A-2003-225053 discloses a cold water extraction method for solving the problems caused by heating, for example, browning of an extract, impairment of a fresh aroma, loss of a fresh tea leaf-like aroma due to increased astringency caused by extraction of catechins in a large amount. By combining these techniques, furthermore, it becomes possible to obtain a tea-based alcoholic drink which contains the aroma components in a large amount, suffers from no thermal denaturation at the extraction step and sustains the rich tea leaf-origin aroma.

Although tea-based alcoholic drinks manufactured by these methods have an outstanding tea leaf-origin aroma, they are still insufficient in umami of tea or body and have considerable alcoholic stimulation as an aftertaste. From the viewpoint of overall qualities, therefore, these products still suffer from problems to be overcome in flavor balance including the aftertaste.

To improve the body of a food or a drink and mask a stimulative smell, seasonings and additives containing peptides have been marketed in these days. However, most of these peptides are obtained by enzymatically treating starting materials such as fishes and cereals. Thus, there is a concern that these seasonings or additives will impair the tea flavor that is the primary characteristic of tea-based drinks. Accordingly, it has been desired to develop a tea-based alcoholic drink which has a "tea leaf-origin aroma", "umami and body" and "mild alcoholic aftertaste" in a good balance.

DISCLOSURE OF INVENTION

Problems to be Solved by the Invention

An object of the present invention is to provide a technique whereby water-insoluble components of tea leaves are made soluble in water and natural umami components inherent to tea leaves presented in an extracts are increased. Another object of the invention is to provide a technique for manufacturing a tea-based alcoholic drink which has "tea leaf-origin aroma", "umami and body" and "mild alcoholic aftertaste" in a good balance.

Means for Solving the Problems

To achieve the objects as described above, the present inventors conducted intensive studies. As a result, they focused their attention on the possibility that the water-insoluble components might be decomposed into components with lower molecular weight and thus made soluble in water by grinding and kneading tea leaves with an extruder, which has been commonly employed for puffing and shaping cereals in the field of the food industry, in addition to hydrolysis under high temperature and high pressure condition. According to the results of the analysis on fundamental components given in *STANDARD TABLES OF FOOD COMPOSITION IN JAPAN* (Fifth Revised Edition, ed. by Resoruce Council, Science and Technology Agency, 2000), tea leaves largely differ from cereals such as brown rice and wheat in amounts of starch and fiber contained therein. When tea leaves are processed with an extruder by a conventional method, therefore, the starting material blows out from the outlet together with steam before it is sufficiently kneaded and gelatinized (with increased viscosity). When the reaction temperature is elevated to such a level as will achieve sufficient results, the flavor qualities inherent to tea leaves are thermally impaired. Thus, it has been considered that extruder processing is unsuitable for tea leaves.

The present inventors conducted intensive studies to solve the above problems. As a result, they have found out that even fiber-rich tea leaves can be processed with an extruder by conducting processing under mild temperature conditions while elevating pressure, as compared with a case of processing cereals, and thus natural umami components inherent to tea leaves can be drawn out without thermally damaging the tea leaves.

In the case of tea (for example, black tea) that has been commonly taken with sugar after extracting tea leaves, there arises no problem in the production method wherein the extruder processing is carried out after adding water and sugar to tea leaves. Therefore, the inventors conceived of the idea of using an aqueous sugar solution as a substitute for water employed in the invention mentioned above to thereby further enhance the effects owing to, for example, a sugar-amino reaction. The inventors have thus found that by adding an aqueous sugar solution in the extruder processing, the natural umami components inherent to tea leaves can be more efficiently drawn out than in the invention mentioned above wherein water alone is used and the effects depend on the kind and concentration of the sugar.

Furthermore, the present inventors have devised a method of manufacturing a tea-based alcoholic drink which comprises the step of extracting a starting material containing the processed tea leaf product as described above with a solvent containing an alcohol to give a tea extract. They have further found that the tea-based alcoholic drink obtained by the above-described method contains water-soluble and fat-soluble components in the processed tea leaf product obtained by the extruder processing and has "tea leaf-origin aroma", "umami and body" and "mild alcoholic aftertaste" in a good balance.

Thus, the inventors have completed the present invention.

Accordingly, the present invention relates to a method which comprises extruder processing tea leaves at a temperature of 80 to 150° C. under a pressure of 0.2 to 30 MPa for 5 to 600 sec while supplying 1 to 100 parts by weight, per 100 parts by weight of the tea leaves, of water or an aqueous sugar solution to thereby stably provide a processed tea leaf product while avoiding blowout from the outlet.

The present invention further relates to a method of producing a tea-based alcoholic drink using a processed tea leaf product as described above, which comprises the step of extracting a starting material, wherein the weight ratio of the processed tea leaf product: tea leaves (b) is 1:9 to 1:0, with a solvent containing 5 to 80% by weight of an alcohol to give a tea extract.

Effects of the Invention

When the processed tea leaf product obtained by the method according to the present invention was extracted with hot water and the preference of the extract as a tea product was sensorily evaluated by skilled panelists, it was clarified that the tea extract obtained by extracting the processed tea leaf product was superior in umami to a tea extract obtained from unprocessed tea leaves and, furthermore, showed no deterioration in qualities due to thermal damage.

To examine the reasons therefore, the contents of water-soluble proteins of the hot water-extract of the tea leaves before extruder processing and the hot water-extract of the processed tea leaves after extruder processing were measured. Thus, it was found that the water-soluble proteins were highly increased due to the hydrolysis reaction and the grinding/kneading procedure. Since the maximum temperature during the extruder processing in the method according to the present invention is lower (i.e., 80 to 150° C.) than in the conventional extruder processing conditions, the contents of major tea components typified by catechin, teanin, caffeine and vitamin C are not affected thereby. Moreover, the umami inherent to tea leaves can be drawn out in the processed tea leaf product according to the present invention, without using any additive except water, which makes it suitable for manufacturing high-quality tea products.

In the case of using an aqueous sugar solution, a processed tea leaf product having an elevated water-soluble protein content could be provided compared with the processed tea leaf product obtained by the extruder processing with the use of sugar-free water, which suggests that the natural umami components were drawn out at a higher efficiency. The processed tea leaf product obtained by the method according to the present invention sustains the added sugar as such after drying. Therefore, an extract of the processed tea leaf product can show not only the savoriness owing to the natural umami components inherent to tea leaves but also a favorable sweetness owing to the sugar.

It is also found that, by the method of the invention of producing a tea-based alcoholic drink which comprises the step of extracting a starting material containing the processed tea leaf product according to the invention with a solvent containing an alcohol to give a tea extract, compared to the conventional tea-based alcoholic drink, a tea-based alcoholic drink having a tea leaf-origin aroma, and showing umami and body and a relieved stimulative alcoholic aftertaste can be manufactured.

BEST MODE FOR CARRYING OUT THE INVENTION

Figure 1:
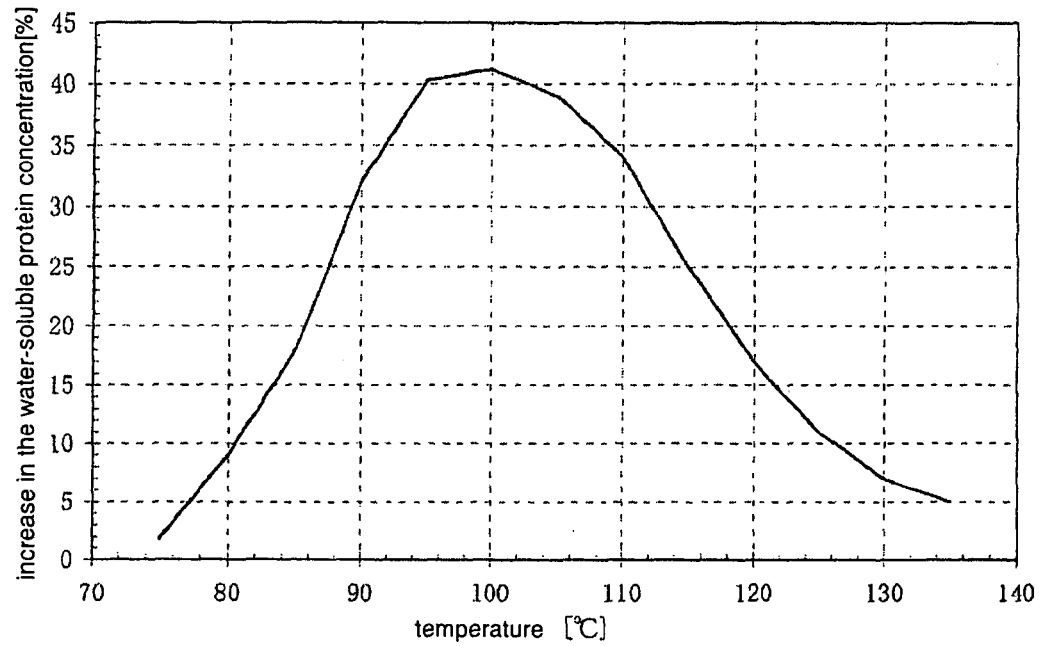
FIG. 1 is a graph showing the results of an examination on the temperature in the extruder processing of the tea leaves in EXAMPLE 1.

In one embodiment of the present invention, tea leaves are processed with an extruder at a temperature in the cylinder of 80 to 150° C. and under a pressure of 0.2 to 30 MPa for a tea leaf migration time (from the inlet to the outlet) of 5 to 600 sec, while supplying 1 to 100 parts by weight of water per 100 parts by weight of the tea leaves.

In another embodiment of the present invention, tea leaves are processed with an extruder at a temperature in the cylinder of 80 to 150° C. and under a pressure of 0.2 to 30 MPa for a tea leaf migration time (from the inlet to the outlet) of 5 to 600 sec, while supplying 1 to 100 parts by weight of an aqueous sugar solution, per 100 parts by weight of the tea leaves.

In a still another embodiment of the present invention, a tea-based alcoholic drink is produced by extracting a starting material, wherein the weight ratio of the processed tea leaf product: tea leaves (b) is 1:9 to 1:0, with a solvent containing 5 to 80% by weight of an alcohol to give a tea extract.

The term "tea leaf (leaves)" as used herein means commonly employed tea leaf materials including unfermented tea (green tea), half-fermented tea (oolong tea), fermented tea (black tea) and so on. Examples of the green tea include sencha (moderate-grade tea), kukicha (stem tea), bancha (coarse tea), gyokuro (high-grade tea), tencha (tea grown in shaded state and then powdered), kamairicha (pan fired tea) and so on. Although kukicha is made from tea stems that are not tea leaves in a strict meaning, tea stems usually fall within the category of tea drink materials similar to tea leaves. Therefore, the tea leaves as used herein also include kukicha. On the other hand, cereal teas containing a large amount of starch such as hatomugicha (Coix lacryma-jobi var. ma-yuen tea) are excluded from the tea leaves as used herein.

The term "tea leaf (leaves)" as used herein further includes not only dried tea leaves commonly employed but also tea leaves at any stage from fresh tea leaves immediately picked from a tea field to the finished product as described above. More specifically speaking, the term "tea leaf (leaves)" as defined herein includes fresh-picked tea leaves not subjected to the enzymatic inactivation step by steaming or pan frying as well as tea leaves having been subjected to the step of steaming or pan frying optionally followed by the rolling step of evaporating moisture by rolling. Either one or more kinds of these tea leaves can be used together in the method according to the present invention.

Among the tea leaves described above, green tea is preferable for the extruder processing using water. In the case of using an aqueous sugar solution in the extruder processing, the obtained processed tea leaf product contains sugar as such after drying. Thus, black tea leaves, etc. having been commonly taken with sugar are most preferable therefor. However, it is also possible by this method to provide a processed tea leaf product of a new type by using tea leaves that have been commonly taken without sugar. From the viewpoint of producing a tea-based alcoholic drink, from among the tea leaves as cited above, highly aromatic varieties such as green tea, oolong tea, jasmine tea and so on, are preferably used.

As one of the applications of the present invention, it is also possible to newly develop a processed tea leaf product by treating tea leaves having the natural umami components in an increased amount (for example, tencha or gyokuro) by the method according to the present invention so as to establish synergistic effect of further increasing the natural umami components. On the contrary, it is possible to develop a processed tea leaf product being rich in the natural umami component at low cost by processing tea leaves having only a small amount of natural umami components (for example, sencha using nibancha (second crop of tea) or sannbancha (third crop of tea) or kukicha) by using the technique of the invention.

In the present invention, the tea leaves before supplying to an extruder may be in any state without restriction. Namely, use may be made of fresh tea leaves, dried ones, dried and ground ones or non-ground ones. In the case of grinding the tea leaves, the extent of the grinding is not particularly restricted. That is, the tea leaves may be either roughly or finely ground with, for example, a roller mill.

The "extruder" to be used in the present invention means an extruder commonly employed for puffing and molding cereals, which has a cylinder equipped with a rotating screw therein. Ordinarily, a starting material is supplied together with water from one end of the cylinder and is then ground and blended therein. Next, it is discharged from a port at the other end. Due to the difference in pressure before and after the discharge from the port, pregelatinized starch puffs and thus a snack or the like having a favorable texture can be obtained. From the viewpoints of workability and handling properties, it is preferable to employ a twin-screw extruder (for example, Food Twin-Screw Extruder Model TEX30FC-18.5PW-V manufactured by The Japan Steel Works, Co.) or a coaxial twin-screw extruder. However, the present invention is not restricted thereto and a twin-screw extruder and a single screw extruder commonly employed in the art may also be used. Namely, the extruder is not restricted in screw structure and parameters such as rotational speed, so long as it satisfies the requirements concerning temperature, pressure, time and water addition level as will be discussed in detail hereinafter.

The term "extruder processing (extrusion)" as used herein means a procedure which comprises using the extruder as described above, supplying a starting material together with water from one end of the cylinder, grinding and blending the same and then discharging it from a port located at the other end.

The processing temperature is not particularly restricted, so long as the maximum temperature in the cylinder ranges from 80 to 150° C. The maximum temperature ranges preferably from 80 to 130° C. and more preferably from 85 to 120° C. When the maximum temperature is lower than 80° C., little effect can be achieved by the extruder processing. On the other hand, it is undesirable that the temperature exceeds 150° C., since tea leaf components are thermally damaged at such a high temperature.

The processing pressure is not particularly restricted, so long as the maximum pressure in the cylinder ranges from 0.2 to 30 MPa. The maximum pressure ranges preferably from 0.2 to 20 MPa and more preferably from 0.6 to 15 MPa. When the maximum pressure is lower than 0.2 MPa, little effect can be achieved by the extruder processing. On the other hand, a pressure exceeding 30 MPa is undesirable from the viewpoints of workability and handling properties.

The processing time is not particularly restricted, so long as the total retention time in the cylinder ranges from 5 to 600 sec. The total retention time ranges preferably from 10 to 120 sec and more preferably from 20 to 60 sec. When the total retention time is shorter than 5 sec, little effect can be achieved by the extruder processing. On the other hand, it is undesirable that the total retention time exceeds 600 sec, since tea leaf components might be thermally damaged in the case of processing at a high temperature.

From the viewpoint of making water-insoluble components soluble in water and drawing out without adding an enzyme preparation, etc., it is preferable in the present invention that the water to be used in the extruder processing or the water to be used in preparing the aqueous sugar solution to be used in the extruder processing is water commonly employed in food processing or purified water free from any contaminant. However, the water to be used herein is not particularly restricted to purified water but it may contain a substance (for example, an alcohol or a salt) that is effective in drawing out the natural umami components inherent to tea leaves and/or in altering components in the processed tea leaf product by the processing, if any. The water addition level is not particularly restricted, so long as the content of water is from 1 to 100 parts by weight per 100 parts by weight of the tea leaves. In the present invention, the content thereof preferably ranges from 3 to 80 parts by weight, more preferably from 5 to 65 parts by weight and particularly preferably from 10 to 40 parts by weight. When the content thereof is less than 1 part by weight per 100 parts by weight of the tea leaves, little effect can be achieved by the extruder processing. When the content thereof exceeds 100 parts by weight, on the other hand, the fluidity of the tea leaves supplied into the cylinder is excessively elevated and, in its turn, there arise problems for the extruder processing such as serious blowout.

The aqueous sugar solution to be used in the processing according to the present invention is a mixture of a sugar with water. Since the aqueous sugar solution is to be blended with the tea leaves under high temperature and high pressure condition in the extruder processing, it is not required that the sugar be soluble in water at room temperature. The term "water" as used herein has the same meaning as described above. The term "sugar" as used herein means a polyhydric alcohol having an aldehyde (—CHO) group or a ketone (C═O) group. The sugar usable in the present invention is not restricted in a number of carbon atoms constituting a ring or a sum of the carbon atoms in the whole molecule. Also, the sugar usable in the present invention includes a deoxy sugar wherein a hydroxyl group in a sugar has been substituted by a hydrogen atom, uronic acid wherein the terminal carbon atom of aldose has been substituted by a carboxyl group, an amino sugar wherein a hydroxyl group has been substituted by an amino group and a sugar alcohol wherein a ketone group or an aldehyde group has been reduced into an alcohol. Furthermore, optical isomers such as D- and L-compounds, chain-type sugars, cyclic sugars and α- and β-sugars with cyclic structure all fall within the category of the sugar usable in the present invention.

Typical examples of a monosaccharide include glucose, fructose, galactose and so on. Typical examples of a disaccharide, which is composed of two monosaccharide molecules bonded together via a glycoside bond to thereby form a single molecule, include maltose, lactose, sucrose and so on. Typical examples of an oligosaccharide, which is composed of three to about ten monosaccharide molecules bonded together, include fructooligosaccharide, galactooligosaccharide, palatinose, kestose, raffinose, maltotriose and so on. Also, those marketed under the trade name "OLIGOSACCHARIDE" fall within this category. A saccharide composed of a larger number of monosaccharides bonded together is called a polysaccharide and typical examples thereof include starch, cellulose, pectin and so on. Furthermore, those generally called "water-soluble dietary fibers" such as dextrin also fall within the category of "polysaccharide" as used herein. Although the sugar to be used in the present invention may be any one of the sugars as described above, a disaccharide or a monosaccharide is preferable and a monosaccharide is still more preferable. Either one of these sugars or a mixture of two or more thereof may be used.

Although the solubility in water of the sugar to be used in the present invention is not particularly restricted, it is preferable, from the viewpoint of preventing the extruder from clogging, to use a sugar that is soluble in water under the extruder processing conditions employed in the method according to the present invention.

Since the processed tea leaf product obtained by the method according to the present invention is extracted and drunk, it is preferable that the sugar to be used in the invention is an edible one having been commonly employed. In the case where it is desired to sweeten the processed tea leaf product, a desired processed tea leaf product can be conveniently obtained by using a sugar having a sweetness.

Although the mixing ratio of the sugar to water in preparing the aqueous sugar solution is not particularly restricted, the concentration of the aqueous sugar solution ranges from 0.01% to 38%, preferably from 2 to 35% and more preferably from 10 to 30%. The concentration of the aqueous sugar solution to be used herein is expressed in % by weight. For example, an aqueous sugar solution having a concentration of 20% means a solution that is prepared by using 20 parts by weight of the sugar as described above and 80 parts by weight of the water as described above.

The present invention also provides a method of producing a processed tea leaf product by adding 1 to 100 parts by weight of an aqueous sugar solution to 100 parts by weight of tea leaves and subjecting the tea leaves to extruder processing characterized in that the processed tea leaf product has a water-soluble protein content higher by 0.1% or more, preferably 1% or more, more preferably 4% or more and still preferably 6% or more, compared with a processed tea leaf product that is produced by subjecting tea leaves to extruder processing while supplying sugar-free water to the tea leaves.

The expression "compared with a processed tea leaf product that is produced by subjecting tea leaves to extruder processing while supplying sugar-free water to the tea leaves" means that the processed tea leaves obtained by the method according to the present invention are compared with a processed tea leaf product that is obtained under the same processing conditions but substituting the aqueous sugar solution employed in the method of the present invention by a sugar-free solution.

The present invention further provides a method which comprises kneading tea leaves with an aqueous sugar solution at a temperature of 80 to 150° C. under a pressure of 0.2 to 30 MPa to thereby increase the amount of water-soluble proteins contained in the tea leaves compared with the amount thereof before kneading, and then extracting the tea leaves with a solvent such as water to thereby give a tea extract having an improved umami compared with a tea extract from tea leaves obtained by kneading tea leaves with sugar-free water in the kneading step.

The expression "tea leaves obtained by kneading tea leaves with sugar-free water in the kneading step" means tea leaves that are obtained under the same kneading conditions but substituting the aqueous sugar solution employed in the method as described above by a sugar-free solution.

The term "water-soluble protein content" as used herein means an amount that can be determined by a technique that is well-known by a person skilled in the art, more specifically speaking, the method described in EXAMPLE 1. It is considered that the natural umami components drawn out into the extract is increased with an increase in the water-soluble protein content, thereby giving a preferable processed tea leaf product from the viewpoint of taste. The taste is also affected by the composition of the water-soluble components.

The present invention furthermore provide a method of producing a tea-based alcoholic drink as described above wherein the processed tea leaf product has a water-soluble protein content higher by 0.1% or more (preferably 5% or more, more preferably 10% or more and still preferably 30% or more) compared with tea leaves not subjected to the extruder processing.

According to the method of the present invention, the processed tea leaf product discharged from the outlet port of the extruder is not in a puffed state (as in a starch-rich food) but typically in a continuously connected state having a smaller volume than before processing. Upon discharge, a size of the processed product depends on the outlet port diameter of the extruder without specific restriction. For example, it is preferable to use an outlet port having a diameter of 2 mm or above. Considering that the processed product discharged from the outlet port would slightly puff due to the starch contained in the tea leaves, it is sometimes observed in this case that the processed product has a size exceeding 2 mm at the discharge. Then, the product may be cut into an arbitrary length and taken out to give a stick-type product. Alternatively, it may be cut with, for example, a cutting blade attached to the outlet port to give a granular product. Namely, the processed tea leaf product is not particularly restricted in shape. In the case of manufacturing tea bags or liquid tea extract, a granular product is favorable from the viewpoint of facilitating the extraction.

The processed tea leaf product according to the present invention, in which the natural umami component inherent to tea leaves have been thus drawn out, can be cooled, dried (using vacuum drying, hot-air drying, etc.) and then stored in, for example, a silo in a conventional manner. After drying, it is preferable that the processed tea leaf product has a moisture content of 10% or less, and more preferably 5% or less.

The processed tea leaf product according to the present invention, in which the natural umami component inherent to tea leaves have been thus drawn out, can be used together with tea leaves, liquid tea extract or the like as one of the starting materials for a tea drink. It can be produced by a commonly employed method in a factory manufacturing tea drinks. For example, a canned tea drink can be produced by a process comprising "extraction", "filtration", "blending", "packing", "seaming", "pasteurization", "cooling" and "box packing". In the case of a product which cannot be retort-pasteurized such as one filled in a PET bottle or a paper container, use is made of a method comprising, for example, conducting pasteurization after blending under the same conditions as described above, cooling the product to a specific temperature and then packing in a container.

In an appropriate mode for carrying out the present invention, the processed tea leaf product according to the present invention may be used in preparing tea bags, liquid tea extract or the like. A processed tea leaf product obtained by processing tea leaves according to the present invention has the sugar sticking thereto. By using such a processed tea leaf product obtained by processing black tea leaves by the method according to the present invention, therefore, it is possible to produce unique tea bags which already sustain sweetness without adding, for example, table sugar after extracting.

The present invention also provides a method of producing a tea-based alcoholic drink using a processed tea leaf product which comprises the step of extracting a starting material, wherein the weight ratio of the processed tea leaf product as described above:tea leaves is 1:9 to 1:0 (preferably 1:2 to 1:0 and more preferably 1:1 to 1:0), with a solvent containing 5 to 80% by weight (preferably 15 to 60% by weight and more preferably 30 to 50% by weight) of an alcohol to give a tea extract.

For the sake of convenience in the present invention, the tea leaves serving as the starting material of the processed tea leaf product are sometimes called "tea leaves (a)" while the tea leaves to be used together with the processed tea leaf product in the step of obtaining a tea extract are sometimes called "tea leaves (b)". The tea leaves (a) and the tea leaves (b) may be either the same or different.

Although the weight ratio of the processed tea leaf product: tea leaves (b) in the starting material to be used in the step of obtaining a tea extract is not specifically restricted so long as it falls within the range of 1:9 to 1:0, it is preferable in the present invention that the weight ratio ranges from 1:2 to 1:0, more preferably from 1:1 to 1:0. When the weight ratio is 1:9 or less, the tea-origin aroma is sufficiently noticeable but the umami, body and alcoholic aftertaste are weakened and, therefore, the desired tea-based alcoholic drink cannot be obtained.

The starting material to be used in the extraction in the above-described step may be an arbitrary one so long as it contains the processed tea leaf product as described above. It may further contain the tea leaves (b) optionally together with substance(s) effective in elevating the extraction efficiency, if any, such as sodium bicarbonate, vitamin C and so on.

The solvent to be used in the step as described above is not particularly restricted, so long as it contains from 5 to 80% by weight of an alcohol. In the present invention, preferably, a solvent containing from 15 to 60% by weight, more preferably from 30 to 50% by weight, of an alcohol, is used. When the alcohol content of the solvent is too small, the water-insoluble components cannot be sufficiently extracted. When the alcohol content is too large, on the other hand, the water-soluble components cannot be sufficiently extracted. Each of these cases is inappropriate for providing an alcoholic drink which fits the object of the present invention. The solvent may be an arbitrary one so long as it contains an alcohol in the desired amount. It may further contain substance(s) effective in elevating the extraction efficiency, if any, such as sodium bicarbonate, vitamin C and so on.

The extraction conditions (for example, extraction temperature and extraction time) for obtaining the tea extract as described above can be appropriately designed by a person skilled in the art. For example, the extraction can be carried out by using the conditions as described in EXAMPLE 2. An appropriate extraction time depends on the alcohol content of the solvent employed. Under the conditions as specified in EXAMPLE 2, for example, it is preferable to carry out the extraction for 8 hours or less, more preferably from about 4 to about 6 hours. In the extraction, agitation may be arbitrarily conducted without restriction.

By preparing a tea-based alcoholic drink by a technique that is well-known by a person skilled in the art with the use of the tea extract obtained by the above process, it becomes possible to produce a tea-based alcoholic drink which contains in a good balance the water-soluble components inherent to tea leaves and the water-soluble or fat-soluble low-molecular components newly obtained by the extruder processing.

The term "tea-based alcoholic drink" as used herein means a drink which contains tea and alcohol as a part of the starting materials (for example, shochu (distilled spirit) diluted with green tea) and is produced via the extraction and blending steps. Also, drinks produced via the extraction step followed by solid/liquid separation and packed drinks produced by the blending, pasteurization and filling steps, etc. are all included in the category of "tea-based alcoholic drink" as described herein.

The present invention further provides the production method as described above wherein the weight ratio [the sum of the processed tea leaf product and the tea leaves (b)][the alcohol in the solvent] is 1:90 to 1:1 (preferably from 1:30 to 1:3 and more preferably from 1:15 to 1:5). When the weight ratio is 1:90 or less, the tea leaf aroma cannot be imparted to the alcohol. On the other hand, it is undesirable that the weight ratio is 1:1 or more, since there is a high risk that the extraction will not be sufficiently completed.

By using the extract obtained by the above process, a tea-based alcoholic drink can be produced by a technique that is well known to a person skilled in the art. The present inventors produced a tea-based alcoholic drink by using the tea extract obtained by the above process. When sensorily evaluated by skilled panelists, it was found out that the thus obtained tea-based alcoholic drink had the tea leaf-origin aroma and umami and body as well as a mild flavor with a relieved alcoholic stimulation as an aftertaste, compared to the conventional tea-based alcoholic drink.

Accordingly, the present invention provides a tea-based alcoholic drink that is obtained by the method as described above. To obtain excellent flavor qualities, it is preferable that the final tea-based alcoholic drink product has an alcohol concentration of from 1 to 25% by weight (preferably from 3 to 10% by weight).

The tea-based alcoholic drink according to the present invention can contain appropriate additive(s) commonly employed in alcoholic drinks, either a single substance or a combination of two or more thereof, for example, water, alcohols, antioxidants, perfumes, various esters, organic acids, organic acid salts, inorganic acids, inorganic acid salts, inorganic salts, emulsifiers, souring agents, sugars, sweeteners, souring agents, fruit juices, vegetable extracts, flower nectar extracts, tea extracts, pH controlling agents, quality stabilizers and so on. A packed tea-based alcoholic drink can be obtained by packing the tea-based alcoholic drink according to the present invention followed by, for example, pasteurization with the use of a technique that is well-known by a person skilled in the art.

As the above statement clearly indicates, the processed tea leaf product according to the present invention contains the water-soluble components originating in the water-insoluble proteins contained in the tea leaves that have been degraded in the course of the extruder processing. Owing to these components, the tea drink extracted from the processed tea leaf product has an improved taste. From another aspect, therefore, the present invention provides a method which comprises kneading tea leaves with water or an aqueous sugar solution at a temperature of 80 to 150° C. under a pressure of 0.2 to 22 MPa to thereby increase the amount of water-soluble proteins contained in the tea leaves compared with the amount thereof before kneading, and then extracting the tea leaves with a solvent such as water to thereby give a tea having an improved umami compared with a tea obtained from tea leaves not subjected to the kneading treatment. The term "solvent such as water" means an arbitrary solvent suitable for tea extraction, preferably an aqueous solvent. The extraction may be conducted at an arbitrary temperature so long as tea extraction can be conducted.

EXAMPLES

The present invention will be described in greater detail by referring to the following Referential Examples and EXAMPLES. However, it is to be understood that the present invention is not restricted thereto.

Referential Example 1

The extruder processing according to the present invention was performed by using Japanese kukicha as the starting tea leaves. As the extruder, Food Twin-Screw Extruder Model TEX30FC-18.5PPW-V (manufactured by The Japan Steel Works, Co.) was used. More specifically speaking, the extruder processing was carried out by supplying ground tea leaves from a material hopper located above the cylinder for supply into the cylinder at a constant speed of 50 kg/h. On the other hand, purified water was supplied from another port into the cylinder at a constant speed of 10 kg/h. By controlling an electrical heater attached to the outside of the cylinder, the maximum temperature in the cylinder was adjusted to 160° C. By controlling the screw structure and the rotational speed, the maximum pressure in the cylinder was adjusted to 2 MPa. Immediately after starting the operation of the extruder under the conditions as described above, steam and the tea leaves vigorously blew out from the outlet of the cylinder. Thus, the operation was ceased.

The extruder processing was carried out under the same conditions but substituting the starting tea leaves by brown rice, wheat or fish meat. As a result, a well puffed and molded processed product having a rich texture could be obtained without blownout in each case.

From above results, tea leaves largely differ in constituents from the materials usually employed in extruder processing, and the purposes of processing these materials with an extruder also largely differ from the purpose of the present invention. Therefore, it has been clarified that attempts should be made to search for extruder processing conditions for tea leaves that are completely different from the conditions conventionally employed in extruder processing.

Example 1

Examination was made with respect to the conditions (temperature, pressure and water-addition level) to be employed in subjecting tea leaves to an extruder processing.
(1) Processing Test 1 (Temperature Condition)
Under a constant maximum extruder processing pressure (i.e., 1.0 MPa) and at a constant water addition level (i.e., 30 parts by weight per 100 parts by weight of the starting material), tea leaves were processed at arbitrarily determined temperature levels while setting the maximum temperature to 75 to 140° C.
(2) Processing Test 2 (Pressure Condition)
At a constant maximum extruder processing temperature (i.e., 110° C.) and a constant water addition level (i.e., 30 parts by weight per 100 parts by weight of the starting material), tea leaves were processed under arbitrarily determined pressure levels while setting the maximum pressure to 0.1 to 2 MPa.
(3) Processing Test 3 (Water Addition Level Condition)
At a constant maximum extruder processing temperature (i.e., 110° C.) and under a constant maximum extruder processing pressure (i.e., 1.0 MPa), tea leaves were processed while adding water at arbitrarily determined water addition levels with setting the maximum water addition level to 1 to 100 parts by weight per 100 parts by weight of the starting material.

1.0 g portions of processed tea leaves products having been subjected to the extruder processing under the individual conditions (1) to (3) and unprocessed tea leaves were each dipped in 10 ml of hot water at 80° C. for 10 min. Next, the obtained infusion was cooled to 20° C. with cold water and then centrifuged in a centrifuge (table top) at 2000×g for 30 min. After completion of the centrifugation, a 100 μl portion of the supernatant of the infusion was sampled with a pipette and adjusted to 1 ml with purified water to thereby give a sample to be analyzed. The water-soluble protein concentration of this sample was measured by Coomassie's method (wavelength: 595 nm).

Results

Figure 2:
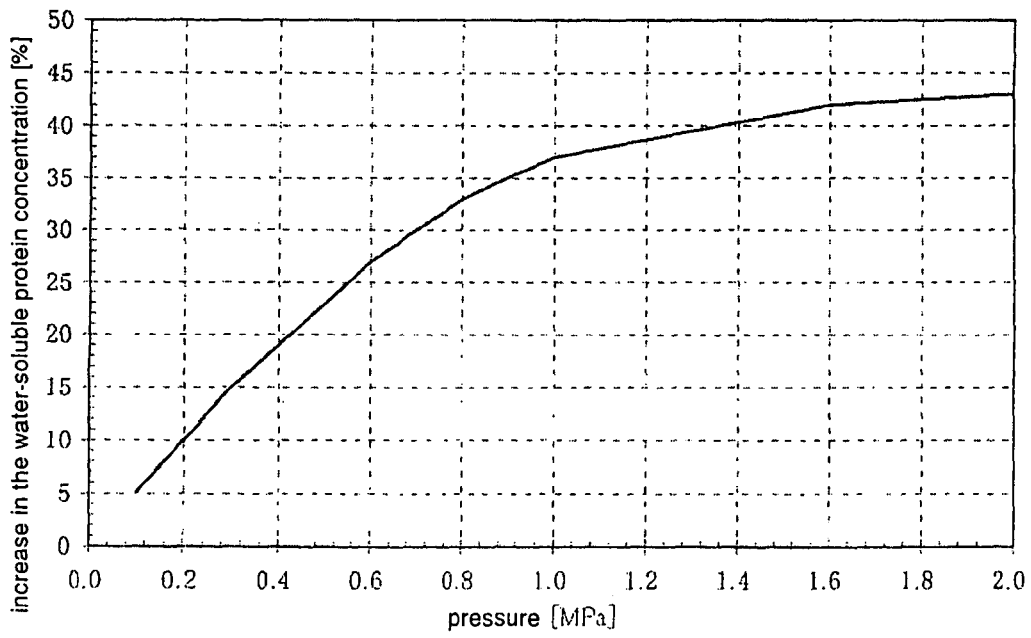
FIG. 2 is a graph showing the results of an examination on the pressure in the extruder processing of the tea leaves in EXAMPLE 1.
Figure 3:
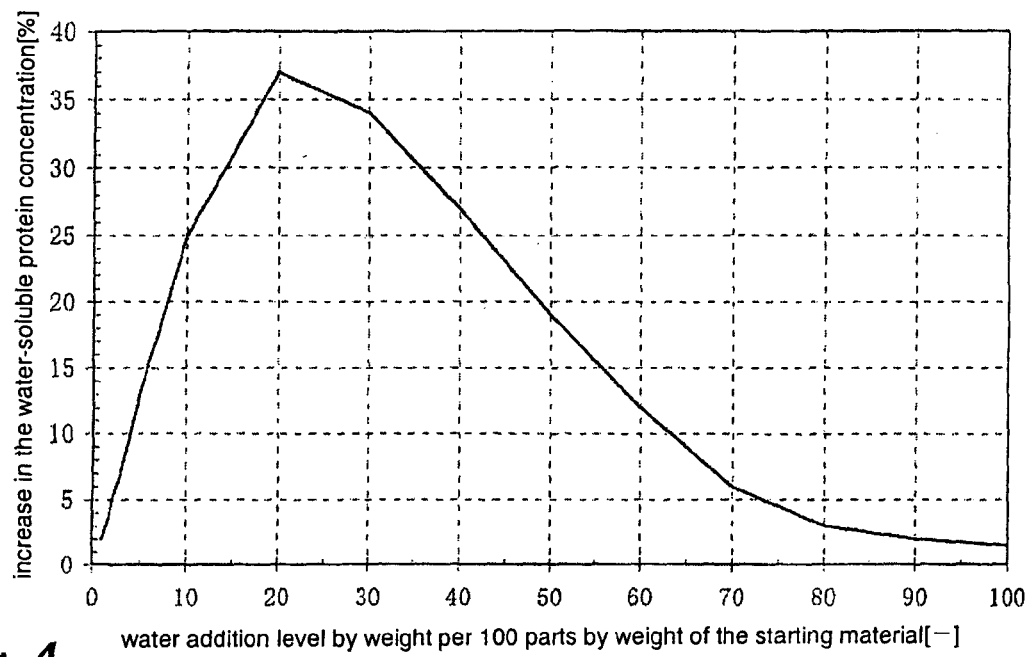
FIG. 3 is a graph showing the results of an examination on the water-addition level in the extruder processing of the tea leaves in EXAMPLE 1.

FIGS. 1, 2 and 3 show the results of the analyses on the samples obtained by the processing tests 1, 2 and 3 respectively. In each of these drawings, the ordinate refers to an increase (percentage) in the water-soluble protein concentration achieved under the processing conditions compared with the water-soluble protein concentration of the unprocessed product.

These results indicate that, in the extruder processing of tea leaves, it is preferable that the maximum temperature in the cylinder is from 80 to 150° C., the maximum pressure in the cylinder is 0.2 MPa or more and the water addition level is from 1 to 100 parts by weight per 100 parts by weight of the tea leaves.

Example 2

The extruder processing according to the present invention was performed by using green tea leaves produced in Shizuoka prefecture as the starting tea leaves. More specifically speaking, the extruder processing was carried out by supplying unground tea leaves from a material hopper located above the cylinder for supply into the cylinder at a constant speed of 50 kg/h. On the other hand, purified water was supplied from another port into the cylinder at a constant speed of 10 kg/h. By controlling an electrical heater attached to the outside of the cylinder, the maximum temperature in the cylinder was adjusted to 120° C. By controlling the screw structure and the rotational speed, the maximum pressure in the cylinder was adjusted to 15 MPa. The retention time of the material in the cylinder, which was measured by using a red colorant acceptable as a food additive, was 45 sec. After continuously operating the extruder under the above-described processing conditions for several hours, the variation in the measured values of each item became constant and thus a steady operation was established. Then, the processed product was cut with a cutting blade attached to the outlet port and rotating at 800 rpm to give a granular processed tea leaf product.

5 g of the processed tea leaf product thus obtained was extracted with 500 ml of purified water at 80° C. for 6 min and filtered. After adding 0.3 g of sodium hydrogencarbonate and 0.4 g of L-ascorbic acid, the total volume was adjusted to 1000 ml by adding purified water to give a concoction. Next, it was pasteurized by heating (130° C., 1 min) and packed in a PET container to give a processed product (of the present invention). On the other hand, tea leaves not subjected to the processing according to the present invention were extracted, filtered, blended, pasteurized and packed in the same manner to give an unprocessed product. As a control, 5 g of tea leaves not subjected to the processing according to the present invention were dipped in 500 ml of purified water containing 0.5% of cellulase at 35° C. and thus enzymatically treated for 60 min. Next, it was subjected to solid/liquid separation by centrifuging and treated in the same manner as the unprocessed product to give a control product. The processed product, the unprocessed product and the control product were evaluated for umami and freshness by skilled panelists. The evaluation was made by a scoring method employed by five skilled panelists and the average was calculated.

Umami was evaluated in three grades, i.e., 3: Tasty, 2: Somewhat tasty and 1: Not tasty. Freshness was evaluated in three grades, i.e., 3: Fresh, 2: Somewhat fresh and 1: Not fresh.

Table 1 shows the results. The processed product got the highest total score (the sum of the umami score and the freshness score). This product was also commented on as having a gyokuro-like umami. It seems that the natural umami components free from any additive would contribute to this gyokuro-like taste. Therefore, a green tea drink having excellent characteristics in flavor, i.e., having well-drawn natural umami components inherent to tea leaves and sustaining a natural mouth feel, could be obtained.

TABLE 1

|  | Processed product of invention | Unprocessed product | Control product |
|---|---|---|---|
| Umami | 2.4 | 1.4 | 2.6 |
| Freshness | 2.4 | 2.8 | 1.6 |
| Total score | 4.8 | 4.2 | 4.2 |

Example 3

The extruder processing according to the present invention was performed by using green tea leaves produced in China as the starting tea leaves. More specifically speaking, the extruder processing was carried out by supplying ground tea leaves from a material hopper located above the cylinder for supply into the cylinder at a constant speed of 40 kg/h. On the other hand, purified water, which had been sufficiently degassed by nitrogen-bubbling, was supplied from another port into the cylinder at a constant speed of 10 kg/h. By controlling an electrical heater attached to the outside of the cylinder, the maximum temperature in the cylinder was adjusted to 150° C. By controlling the screw structure and the rotational speed, the maximum pressure in the cylinder was adjusted to 10 MPa. The retention time of the material in the cylinder, which was measured by using a red colorant acceptable as a food additive, was 52 sec. After continuously operating the extruder under the above-described processing conditions for several hours, the variation in the measured values of each item became constant and thus a steady operation was established. Then, the processed product was cut with a cutting blade attached to the outlet port and rotating at 1500 rpm to give a granular processed tea leaf product.

10 g portions of the processed tea leaf product thus obtained and tea leaves not subjected to the extruder processing according to the present invention were each extracted with 100 ml of purified water at 80° C. for 30 min and filtered. Thus, the extract of the processed product and the extract of the unprocessed product were obtained. For evaluation, the water-soluble protein content (mg/g—material) of each extract was measured by Coomassie's method (wavelength: 595 nm).

Figure 4:
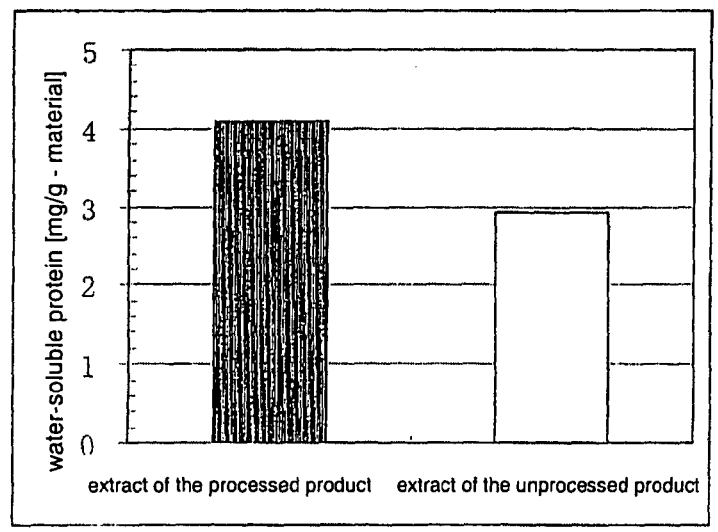
FIG. 4 is a graph showing the contents of water-soluble proteins of the extract of the processed tea leaf product according to the present invention and that of an extract obtained from tea leaves not subjected to extruder processing in EXAMPLE 3.

FIG. 4 shows the results. As FIG. 4 clearly indicates, the extract of the processed product showed an increase of about 40% in the water soluble protein content compared with the extract of the unprocessed product.

Next, the water-soluble sugar content (g/g—material) of each extract was determined. The water-soluble sugar content* was calculated in accordance with the following formula wherein (B) stands for the Brix of the extract, (A) stands for the amount of the liquid collected and (C) stands for the weight of the tea leaves. Brix was measured by using RX-5000a (manufactured by ATAGO) and dropping about 0.5 ml of the extract into the measurement dish.

*(g/g-material)=$A(g) \times B(\%)/100/C(g)$

Table 2 shows the results. As Table 2 clearly indicates, little difference in water-soluble sugar content was observed between the extract of the processed product and the extract of the unprocessed product. Thus, it can be understood that, owing to the process according to the present invention, the natural umami components mainly comprising water-soluble proteins had been selectively drawn out from tea leaves while the reaction of decomposing fibrous components to form sugars due to thermal damage was regulated.

TABLE 2

|  | Extract of processed product of invention | Extract of unprocessed product |
|---|---|---|
| Water-soluble sugar [g/g - material] | 0.334 | 0.340 |

Example 4

The extruder processing according to the present invention was performed as in EXAMPLE 3 but employing the following conditions: material tea leaves: green tea leaves produced in China, speed of supplying tea leaves: 15 kg/h, water supplied: purified water, speed of supplying purified water: 4 kg/h, maximum temperature: 90° C., maximum pressure: 1.0 MPa, retention time in cylinder: 45 sec; rotational speed of cutting blade attached to outlet port: 1200 rpm.

Using the processed tea leaf product thus obtained and tea leaves not subjected to the processing according to the present invention, extracts were obtained as in EXAMPLE 3 and the water-soluble protein contents and water-soluble sugar contents were determined.

Figure 5:
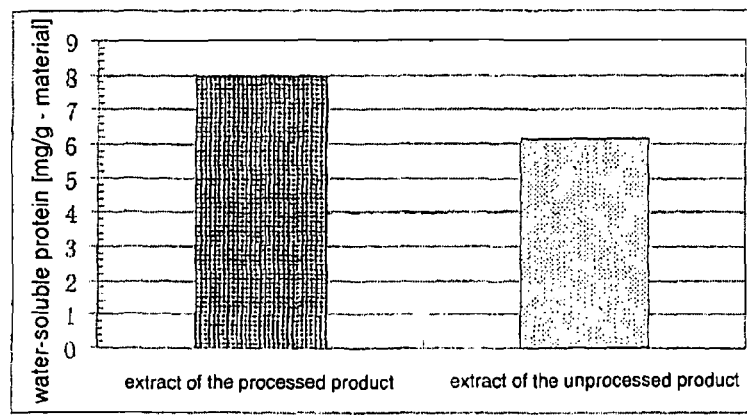
FIG. 5 is a graph showing the contents of water-soluble proteins of the extract of the processed tea leaf product and that of an extract obtained from unprocessed tea leaves in EXAMPLE 4.

FIG. 5 shows the results of the water-soluble protein content determination. As FIG. 5 clearly indicates, the extract of the processed product showed an increase of about 30% in water-soluble protein content compared with the extract of the unprocessed product.

Table 3 shows the results of the water-soluble sugar content determination. As Table 3 clearly indicates, little difference in water-soluble sugar content was observed between the extract of the processed product and the extract of the unprocessed product. Thus, it can be assumed that, owing to the process according to the present invention, the natural umami components mainly comprising water-soluble proteins had been selectively drawn out from tea leaves while the reaction of decomposing fibrous components to form sugars due to thermal change was regulated. It can be also understood that the processed tea leaf product showed changes in the composition of the individual components compared with the tea leaves.

TABLE 3

|  | Extract of processed product of invention | Extract of unprocessed product |
|---|---|---|
| Water-soluble sugar [g/g - material] | 0.43 | 0.45 |

Example 5

The extruder processing according to the present invention was performed by using maccha (powdered green tea) produced in Japan as the starting tea leaves. More specifically speaking, the extruder processing was carried out by supplying tea leaves from a material hopper located above the cylinder for supply into the cylinder at a constant speed of 30 kg/h. On the other hand, purified water was supplied from another port into the cylinder at a constant speed of 3 kg/h. By controlling an electrical heater attached to the outside of the cylinder, the maximum temperature in the cylinder was adjusted to 100° C. By controlling the screw structure and the rotational speed, the maximum pressure in the cylinder was adjusted to 5 MPa. The retention time of the material in the cylinder, which was measured by using a red colorant acceptable as a food additive, was 10 sec. After continuously operating the extruder under the above-described processing conditions for several hours, the variation in the measured values of each item became constant and thus a steady operation was established. Then, the processed product was cut by hand at specific intervals to give a stick-type processed tea leaf product.

5 g of the processed tea leaf product thus obtained was extracted with 500 ml of purified water at 80° C. for 5 min and filtered. After adding 0.3 g of sodium hydrogencarbonate and 0.4 g of L-ascorbic acid, the total volume was adjusted to 1000 ml by adding purified water to give a concoction. A 200 ml portion thereof was packed in a metal can and pasteurized by heating (130° C., 5 min) to give a processed tea leaf product. On the other hand, 4.5 g of tea leaves not subjected to the processing according to the present invention were extracted with 500 ml of purified water at 80° C. and filtered. After adding 0.3 g of sodium hydrogencarbonate and 0.4 g of L-ascorbic acid, 0.5 g of maccha produced in Japan having been not subjected to the process according to the invention was further added thereto. Next, the total volume was adjusted to 1000 ml by adding purified water to give a concoction. A 200 ml portion thereof was packed in a metal can and pasteurized by heating (130° C., 5 min). The processed product and the control product were evaluated in umami and refreshing feel by skilled panelists. The evaluation was made by a scoring method employed by five skilled panelists and the average was calculated.

Umami was evaluated in three grades, i.e., 3: Tasty, 2: Somewhat tasty and 1: Not tasty. Refreshing feel was evaluated in three grades, i.e., 3: Refreshing, 2: Somewhat refreshing and 1: Not refreshing. Table 4 shows the results.

TABLE 4

|  | Processed product of invention | Control product |
|---|---|---|
| Umami | 2.4 | 2.6 |
| Refreshing feel | 2.6 | 1.4 |
| Total score | 5.0 | 4.0 |

As Table 4 clearly shows, the sensory evaluation data indicate that the processed product was superior both in refreshing mouth feel and in umami to the control product. The control product was also commented on as being powdery and coarse (heavy) compared with the processed product. This is seemingly because in control product, solid matters were enclosed as such in the extract, while the natural umami components had been dissolved in the extract of the processed product. Namely, it was found that a tea drink sustaining the inherent refreshing feel and having umami, i.e., being excellent in the flavor qualities, could be obtained by the starting material processed according to the present invention.

Example 6

The extruder processing according to the present invention was performed as in EXAMPLE 5 but employing the following conditions: material tea leaves: maccha produced in Japan, speed of supplying tea leaves: 12 kg/h, water supplied: purified water, speed of supplying purified water: 3 kg/h, maximum temperature: 100° C., maximum pressure: 5 MPa, retention time in cylinder: 30 sec.

By using the processed tea leaf product thus obtained and unprocessed tea leaves, alcoholic drinks were produced. More specifically speaking, the starting materials listed in the column "Tea Extract" in Table 5 were mixed and extracted to give a tea extract. The starting materials were dipped for 8 hours or shorter and then the materials were filtered off. Next, the tea extract was mixed with the remainder of the materials and dissolved. Thus, a processed products (1) and (2) and control products (1) and (2), each an alcoholic drink, were obtained.

[Table 5]

TABLE 5

Composition of alcoholic drink

|  | Processed product (1) of invention | Processed product (2) of invention | Control product (1) | Control product (2) | Remarks |
|---|---|---|---|---|---|
| Tea extract | | | | | |
| Processed tea leaf product | 1.12 g | 0.56 g | | 1.12 g | |
| Unprocessed tea leaves | | 0.56 g | 1.12 g | | |
| Dilute neutral spirits | 22.5 ml | 22.5 ml | 22.5 ml | 22.5 ml | * Alcohol 47 wt. % |
| Purified water | | | | | |
| Sodium hydrogen carbonate | 0.09 g | 0.09 g | 0.09 g | 0.09 g | |
| L-Ascorbic acid | 0.1 g | 0.1 g | 0.1 g | 0.1 g | |
| Dilute neutral spirits | | | | 22.5 ml | * Alcohol 47 wt. % |
| Purified water | ca. 227 ml | ca. 227 ml | ca. 227 ml | ca. 205 ml | |
| Total | 250 ml | 250 ml | 250 ml | 250 ml | |

The components of the processed product (1) and (2) and the control product (1) were analyzed. More specifically speaking, alcohol concentration, Brix, catechin concentration and soluble protein concentration of each drink were measured. Alcohol concentration was measured with the use of a density/specific gravity meter DA-520 (manufactured by Kyoto Electronics Manufacturing Co., Ltd.). Brix was measured by using RX-5000a (manufactured by ATAGO) and dropping about 0.5 ml of each extract into a dish. Catechin concentration was measured by using a high performance liquid chromatograph (manufactured by Shimadzu Co.). Soluble protein concentration of drink was measured by Coomassie's method (wavelength: 595 nm). Table 6 shows the results.

[Table 6]

TABLE 6

Analysis on component of tea-based alcoholic drink

|  | Processed product (1) of invention | Processed product (2) of invention | Control product (1) |
|---|---|---|---|
| Alcohol conc. [wt. %] | 5.3 | 5.3 | 5.3 |
| Brix [%] | 2.1 | 2.0 | 2.1 |

TABLE 6-continued

Analysis on component of tea-based alcoholic drink

|  | Processed product (1) of invention | Processed product (2) of invention | Control product (1) |
|---|---|---|---|
| Catechin conc. [ppm] | 361 | 385 | 419 |
| Soluble protein of drink [mg/ml] | 3.9 | 3.8 | 3.9 |

Table 6 indicates that the processed products (1) and (2) showed each a decrease in the catechin concentration and almost the same alcohol concentration, Brix and soluble protein of drink compared with the control product (1). Considering these results together with the analytical data of hot water extracts in EXAMPLE 1, it can be understood that a drink differing from the conventional tea-based alcoholic drink in the balance of the components could be obtained by producing a tea-based alcoholic drink with the use of the tea leaves having been subjected to the extruder processing. It is also indicated that the soluble protein extracted with cold alcohol were different from those extracted with hot water.

Example 7

The processed products and the control product obtained in EXAMPLE 6 were evaluated in "tea-origin aroma", "umami and body" and "alcoholic aftertaste" by skilled panelists. The evaluation was made by a scoring method employed by five skilled panelists and the average was calculated.

"Tea-origin aroma" was evaluated in three grades, i.e., 3: Noticeable, 2: Somewhat noticeable and 1: Unnoticeable. "umami and body" was evaluated in three grades, i.e., 3: Noticeable, 2: Somewhat noticeable and 1: Unnoticeable. "Alcoholic aftertaste" was evaluated in three grades, i.e., 3: Mild with no stimulation, 2: Somewhat stimulative and 1: Strongly stimulative. Table 7 shows the results.

[Table 7]

TABLE 7

Evaluation results

|  | Processed product (1) of invention | Processed product (2) of invention | Control product (1) | Control product (2) |
|---|---|---|---|---|
| Tea-origin aroma | 2.4 | 2.6 | 2.8 | 1.4 |
| Umami and body | 2.4 | 2.2 | 1.6 | 2.2 |
| Alcoholic after taste | 2.6 | 2.0 | 1.2 | 2.0 |
| Total score | 2.5 | 2.3 | 1.9 | 1.9 |

As Table 7 clearly indicates, the processed products (1) and (2) were somewhat inferior to the control product (1) in "tea-origin aroma" but highly superior thereto in "umami and body" and "alcoholic after taste". Furthermore, the processed products (1) and (2) each showed a good balance of these three items and, as a result, obtained a total score (i.e., the average of these three items) exceeding that of the control product (1). Furthermore, the control product (1) was commented on as having a steamy smell, stimulation caused by alcohol and so on, while the processed products (1) and (2) were commented on as having a light smell, a refreshing feel, a soft texture and a mild after taste.

When compared with the control product (2), the processed products (1) and (2) according to the present invention were each remarkably superior in "tea-origin aroma" and, as a result, got a total score (i.e., the average of these three items) exceeding that of the control product (2). Accordingly, it has been clarified that an alcoholic drink having a tea leaf-origin aroma, showing umami and body and a mild flavor with relieved stimulative after taste of alcohol, compared with the conventional tea-based alcoholic drinks, can be obtained by the method of producing a tea-based alcoholic drink according to the present invention, which comprises the step of extracting a starting material containing the processed tea leaf product with a solvent containing an alcohol to give a tea extract.

Example 8

The extruder processing according to the present invention was performed by using black tea leaves produced in Sri Lanka as the starting tea leaves. More specifically speaking, the extruder processing was carried out by supplying the tea leaves from a material hopper located above the cylinder for supply into the cylinder at a constant speed of 40 kg/h. On the other hand, 20% aqueous sugar solutions, which had been prepared by dissolving in purified water respectively a monosaccharide [high fructose corn syrup (fructose+glucose), F55 (FRUCTOKA) manufactured by Kato Kagaku K.K.], a disaccharide [table sugar (sucrose), Granulated Sugar CIM2, manufactured by ITOCHU SUGAR Co., Ltd.], an oligosaccharide [fructooligosaccharide, MEIOLIGO P (liquid), manufactured by FOOD MATERA Co., Ltd.] and water-soluble dietary fiber [scarcely digestible dextrin, PINEFIBER, manufactured by Matsutani Chemical Industry Co., Ltd.], were each supplied from another port into the cylinder at a constant speed of 10 kg/h. By controlling an electrical heater attached to the outside of the cylinder, the maximum temperature in the cylinder was adjusted to 95° C. By controlling the screw structure and the rotational speed, the maximum pressure in the cylinder was adjusted to 1.5 MPa. The retention time of the material in the cylinder, which was measured by using a red colorant acceptable as a food additive, was 45 sec. After continuously operating the extruder under the above-described processing conditions for several hours, the variation in the measured values of each item became constant and thus a steady operation was established. Then, the processed product was cut with a cutting blade attached to the outlet port and rotating at 1000 rpm to give a granular processed tea leaf product.

Figure 6:
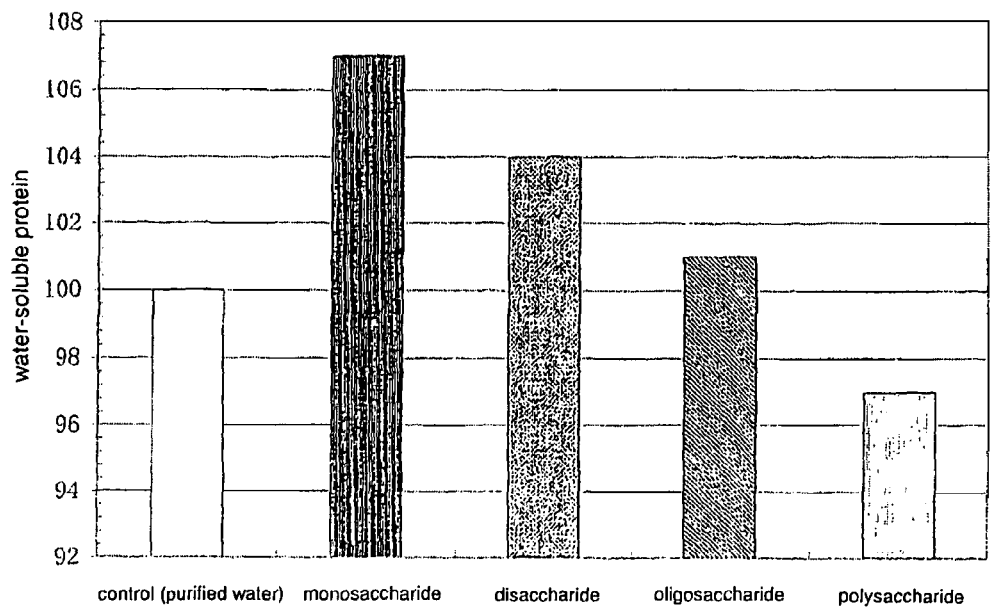
FIG. 6 is a graph showing the results of an examination on the kinds of sugars in the aqueous sugar solution employed in the extruder processing of the tea leaves in EXAMPLE 8.

1 g portions of the processed tea leaf products thus obtained and a product having been processed under the same conditions but adding purified water were each extracted with 100 ml of purified water at 80° C. for 30 min and filtered. Thus, extract of the processed products and extract of the control product were obtained. For evaluation, the water-soluble protein content (mg/g—material) of each extract was measured by Coomassie's method (wavelength: 595 nm). FIG. 6 shows the results wherein the measured value of the extract of the control product is referred to as 100.

As FIG. 6 clearly shows, the extracts of the processed products, excluding the one processed by adding the dietary fiber solution, showed an increase in the water-soluble protein content compared with the extract of the control product. It was also found that a larger increase was achieved at the smaller number of saccharide molecules bonded together. The processed products are seemingly different from the control product in the principle of acquiring proteins. Therefore, it is considered that the extracts of the processed products are different in the kinds and composition of water-soluble proteins and, as a result, even a slight change would largely affect the sensory evaluation.

Example 9

The extruder processing according to the present invention was performed by using green tea leaves produced in Shizuoka prefecture as the starting tea leaves. More specifically speaking, the extruder processing was carried out by supplying the tea leaves from a material hopper located above the cylinder for supply into the cylinder at a constant speed of 40 kg/h. On the other hand, aqueous sugar solutions having glucose concentrations of 20%, 40% and 60% were each supplied from another port into the cylinder at a constant speed of 10 kg/h. By controlling an electrical heater attached to the outside of the cylinder, the maximum temperature in the cylinder was adjusted to 95° C. By controlling the screw structure and the rotational speed, the maximum pressure in the cylinder was adjusted to 1.5 MPa. The retention time of the material in the cylinder, which was measured by using a red colorant acceptable as a food additive, was 45 sec. After continuously operating the extruder under the above-described processing conditions for several hours, the variation in the measured values of each item became constant and thus a steady operation was established. Then, the processed product was cut with a cutting blade attached to the outlet port and rotating at 1000 rpm to give a granular processed tea leaf product.

Figure 7:
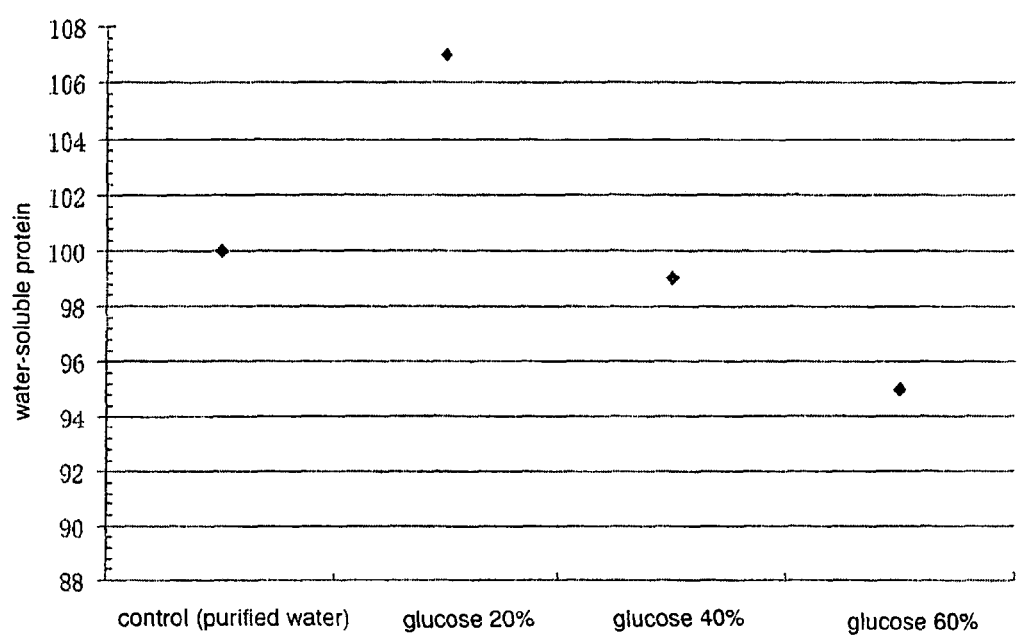
FIG. 7 is a graph showing the results of examination of the glucose concentration in the extruder processing of the tea leaves in EXAMPLE 9.

1 g portions of the processed tea leaf products thus obtained and a product having been processed under the same conditions but adding purified water were each extracted with 100 ml of purified water at 80° C. for 30 min and filtered. Thus, extract of the processed products and extract of the control product were obtained. For evaluation, the water-soluble protein content (mg/g—material) of each extract was measured by Coomassie's method (wavelength: 595 nm). FIG. 7 shows the results wherein the measured value of the extract of the control product is referred to as 100.

As FIG. 7 clearly shows, the extract of the processed product according to the present invention obtained by using the aqueous sugar solution having a glucose concentration of 20% showed an increase in the water-soluble protein content compared with the extract of the control product. It was also found out that the measurement value decreased with an increase in the glucose concentration (i.e., 40% and 60%).

Example 10

Using black tea leaves produced in Assam as the starting tea leaves, the extruder processing according to the present invention was carried out as in EXAMPLE 8. From the processed tea leaf product thus obtained, black tea packed in tea bags was produced. More specifically speaking, the tea leaves were processed with a CTC machine (a machine wherein tea leaves pass through a space between two stainless rollers by which the tea leaves are winded and crushed, and torn due to projections formed on the roller surface and, at the same time, curled and shaped into spheres by grooves formed obliquely thereon) and then packed in fine-mesh paper bags. A tea bag using the processed tea leaf product according to the present invention was put into a tea cup and extracted by pouring hot water and then the obtained black tea was tasted. As a result, the black tea had a comparatively mild taste of bitterness, tannin, caffeine and so on, which would be relatively strongly noticeable based on the total balance in usual black tea products packed in tea bags, and gave a favorable impression of well-balanced total flavor qualities.

The invention claimed is:

1. A method of producing a processed tea leaf product comprising extruder processing tea leaves under a pressure with an extruder, wherein a maximum temperature in a cylinder of the extruder during the extruder processing is 80° C. to 130° C., wherein the extruder processing is conducted by supplying (1) the tea leaves and (2) an aqueous sugar solution without any additional additive, and wherein a maximum pressure in the cylinder during the extruder processing is 0.2 MPa to 30 MPa, and wherein the extruder processing is conducted while supplying 1 to 100 parts by weight of the aqueous sugar solution, per 100 parts by weight of the tea leaves.

2. The method according to claim 1, wherein the processed product has a water-soluble protein content that is higher by 5% or more compared with tea leaves that are not subjected to the extruder processing.

3. The method according to claim 1, wherein the processed tea leaf product has a water-soluble protein content that is higher by 0.1% or more compared with a processed tea leaf product that is produced by subjecting tea leaves to the extruder processing while supplying sugar-free water to the tea leaves.

4. The method according to claim 1, wherein a concentration of the aqueous sugar solution is 0.01% to 38%.

5. The method according to claim 1, wherein a sugar contained in the aqueous sugar solution is a monosaccharide, a disaccharide or an oligosaccharide.

6. A method of producing a tea drink comprising the steps of producing a processed tea leaf product by extruder processing tea leaves under a pressure with an extruder, wherein a maximum temperature in a cylinder of the extruder during the extruder processing is 80° C. to 130° C., wherein the extruder processing is conducted by supplying (1) the tea leaves and (2) an aqueous sugar solution without any additional additive, wherein a maximum pressure in the cylinder during the extruder processing is 0.2 MPa to 30 MPa, and extracting the processed tea leaf with a solvent to give a tea drink, and wherein the extruder processing is conducted while supplying 1 to 100 parts by weight of the aqueous sugar solution, per 100 parts by weight of the tea leaves.

7. The method according to claim 6, wherein a concentration of the aqueous sugar solution is 0.01% to 38%.

8. The method according to claim 6, wherein a sugar contained in the aqueous sugar solution is a monosaccharide, a disaccharide or an oligosaccharide.

* * * * *